(12) United States Patent
Hock

(10) Patent No.: US 8,508,809 B2
(45) Date of Patent: Aug. 13, 2013

(54) IMAGE READING APPARATUS AND IMAGE READING METHOD

(75) Inventor: Tee Boon Hock, Singapore (SG)

(73) Assignee: Seiko Epson Corporation, Tokyo (JP)

( * ) Notice: Subject to any disclaimer, the term of this patent is extended or adjusted under 35 U.S.C. 154(b) by 387 days.

(21) Appl. No.: 12/790,658

(22) Filed: May 28, 2010

(65) Prior Publication Data
US 2010/0302607 A1 Dec. 2, 2010

(30) Foreign Application Priority Data

Jun. 1, 2009 (JP) ................................. 2009-131783

(51) Int. Cl.
*H04N 1/04* (2006.01)
*H04N 1/40* (2006.01)
*G03F 3/08* (2006.01)
*G06F 3/12* (2006.01)
*G06K 15/00* (2006.01)
*B41J 2/47* (2006.01)

(52) U.S. Cl.
USPC ........... 358/474; 358/488; 358/448; 358/518; 358/1.15; 358/3.03; 358/3.24; 347/234

(58) Field of Classification Search
USPC ............... 358/474, 488, 448, 518, 1.15, 3.03, 358/3.24; 347/234; 250/208.7
See application file for complete search history.

(56) References Cited

U.S. PATENT DOCUMENTS

| | | | |
|---|---|---|---|
| 5,336,878 A | 8/1994 | Boyd et al. | |
| 6,474,836 B1* | 11/2002 | Konagaya | 362/231 |
| 6,486,906 B1* | 11/2002 | Foster et al. | 347/234 |
| 6,559,976 B1* | 5/2003 | Hirota | 358/3.03 |
| 6,747,766 B1 | 6/2004 | Kamisuwa et al. | |
| 7,054,040 B2 | 5/2006 | Shoda et al. | |
| 2007/0064267 A1* | 3/2007 | Murakata et al. | 358/1.15 |
| 2009/0231606 A1* | 9/2009 | Kawai et al. | 358/1.9 |
| 2009/0251747 A1* | 10/2009 | Muramatsu | 358/518 |
| 2009/0284800 A1* | 11/2009 | Misawa | 358/3.24 |
| 2009/0323013 A1* | 12/2009 | Liao et al. | 349/189 |
| 2010/0073739 A1* | 3/2010 | Sekiguchi et al. | 358/474 |
| 2010/0110506 A1* | 5/2010 | Katou et al. | 358/488 |

FOREIGN PATENT DOCUMENTS

| | | |
|---|---|---|
| JP | 01-097055 A | 4/1989 |
| JP | 03-104476 A | 5/1991 |
| JP | 07-023181 A | 1/1995 |
| JP | 08-139949 A | 5/1996 |
| JP | 10-042157 A | 2/1998 |
| JP | 2001-016442 A | 1/2001 |

(Continued)

*Primary Examiner* — Charlotte M Baker
*Assistant Examiner* — Rury Grisham
(74) *Attorney, Agent, or Firm* — Kilpatrick Townsend & Stockton LLP

(57) ABSTRACT

An image reading apparatus that optically reads a document includes: multiple line sensors provided approximately parallel to each other and each having light-receiving elements arranged in line form, each line sensor capturing respective line-shaped regions spanning in the main scanning direction of the document in respective color components; a movement unit that causes the positional relationship between the document and the multiple line sensors to move relative to the sub scanning direction that is orthogonal to the main scanning direction; a color skew adjustment unit that adjusts positional skew in the sub scanning direction in scan data of each of the color components captured by the multiple line sensors in synchronization with the movement caused by the movement unit, in accordance with an offset amount based on the distance between each of the multiple line sensors.

9 Claims, 11 Drawing Sheets

(56) References Cited

FOREIGN PATENT DOCUMENTS

| JP | 2001-094798 A | 4/2001 |
|----|---------------|--------|
| JP | 2002-112046 A | 4/2002 |
| JP | 2002-247292 A | 8/2002 |
| JP | 2003-219116 A | 7/2003 |
| JP | 2004-241809 A | 8/2004 |

* cited by examiner

IMAGE READING APPARATUS AND IMAGE READING METHOD

This application claims priority to Japanese Patent Application No. 2009-131783, filed Jun. 1, 2009, the entirety of which is incorporated by reference herein.

BACKGROUND

1. Technical Field

The present invention relates to an image reading apparatus (image scanner) that optically reads a document.

2. Related Art

An apparatus in which multiple line sensors that respectively image different color components individually (for example, red, blue, and green) are disposed approximately parallel to one another in the main scanning direction, and a document is read while moving the positional relationship between the multiple line sensors and the document relative to each other in the sub scanning direction, which is orthogonal to the main scanning direction, is known as a past example of an image reading apparatus (see JP-A-1-97055 and JP-A-7-23181). With such an image reading apparatus, scan data of each color component imaged by the multiple line sensors at the same timing is thus data in which regions of the document that are skewed relative to each other in the sub scanning direction have been imaged. The positional skew in the sub scanning direction of the scan data for the respective color components is then adjusted in accordance with an offset amount based on the distance between the multiple line sensors, and image data expressing the original document is then generated based on the adjusted scan data.

However, in the past, there has been a problem in that if the image formation magnification of the document as formed upon the line sensors deviates from the design value for some reason (for example, individual differences in the optical system, deterioration due to age, and so on), positional skew in the sub scanning direction caused by the amount of the deviation in the image formation magnification will appear in the post-adjustment scan data. Positional skew in the sub scanning direction in the post-adjustment scan data is a cause of color skew in the image data that expresses the document.

SUMMARY

An advantage of some aspects of the invention is to provide a technique that makes it possible to suppress color skew in image data expressing a document.

Having been conceived in order to solve at least one of the aforementioned problems, the invention can be implemented as the following aspects or application examples.

Application Example 1

An image reading apparatus according to a first application example is an image reading apparatus that optically reads a document. The image reading apparatus includes: multiple line sensors provided approximately parallel to each other and each having light-receiving elements arranged in line form, each line sensor capturing respective line-shaped regions spanning in the main scanning direction of the document in respective color components; a movement unit that causes the positional relationship between the document and the multiple line sensors to move relative to the sub scanning direction that is orthogonal to the main scanning direction; a color skew adjustment unit that adjusts positional skew in the sub scanning direction in scan data of each of the color components captured by the multiple line sensors in synchronization with the movement caused by the movement unit, in accordance with an offset amount based on the distance between each of the multiple line sensors; an image generating unit that generates image data expressing the document based on the scan data of each of the color components adjusted by the color skew adjustment unit; and an offset correction unit that corrects the offset amount used in the adjustment of the scan data based on a magnification change amount, the magnification change amount being the amount of change in the image formation magnification from a design value, an image of the document being formed upon the light-receiving elements. According to the image reading apparatus of the first application example, the offset amount for adjusting positional skew in the sub scanning direction in the scan data of each of the color components can be corrected based on the magnification change amount of the image forming magnification, and thus color skew in the image data expressing the document can be suppressed.

Application Example 2

In the image reading apparatus according to the first application example, the offset correction unit may correct the offset amount used in the adjustment of the scan data based on the magnification change amount after the image reading apparatus has been started up and before reading the document. According to the image reading apparatus of a second application example, the offset amount can be corrected prior to reading a document.

Application Example 3

The image reading apparatus according to the first or second application examples may further include first and second markers provided at a basic distance from each other in positions in which the markers can be captured by the multiple line sensors. The offset correction unit may have: an imaging distance calculation unit that calculates an imaging distance indicating the distance between the first and second markers based on image data obtained by reading the first and second markers using the multiple line sensors; a change amount calculation unit that calculates the magnification change amount by comparing the basic distance with the imaging distance; and a first correction unit that corrects the offset amount used in the adjustment of the scan data based on the magnification change amount calculated by the change amount calculation unit. According to the image reading apparatus of the third application example, the offset amount can be corrected based on the magnification change amount arising due to individual error in the optical magnification, deterioration due to age, and so on of the optical system leading from the document to the light-receiving elements.

Application Example 4

The image reading apparatus according to the first or third application examples may further include a document plate forming a transparent plane that is transparent to the multiple line sensors and that holds the document. The offset correction unit may have a second correction unit that corrects the offset amount used in the adjustment of the scan data based on a magnification change amount arising due to the distance between the document and the transparent plane. According to the image reading apparatus of the fourth application example, the offset amount can be corrected based on the magnification change amount of the image forming magnification arising due to the distance between the document and the transparent plane.

Application Example 5

The image reading apparatus according to the first or fourth application examples may further include: a lens that forms light from the document as an image upon the multiple line sensors; and a focus unit that causes the lens to move to a position in which the document is in focus. The offset correction unit may have a third correction unit that corrects the offset amount used in the adjustment of the scan data based on a magnification change amount arising due to the movement of the lens by the focus unit. According to the image reading apparatus of a fifth application example, the offset amount can be corrected based on the magnification change amount of the image forming magnification arising due to the movement of the lens.

Application Example 6

An image reading apparatus according to a sixth application example is an image reading apparatus that optically reads a document. The image reading apparatus includes: multiple line sensors provided approximately parallel to each other and each having light-receiving elements arranged in line form, each line sensor capturing respective line-shaped regions spanning in the main scanning direction of the document in respective color components; a movement unit that causes the positional relationship between the document and the multiple line sensors to move relative to the sub scanning direction that is orthogonal to the main scanning direction; a storage unit that stores a corrected offset amount, in which an offset amount in the sub scanning direction based on the distance between the multiple line sensors in scan data of each of the color components captured by the multiple line sensors has been corrected, prior to shipping, based on individual error of the optical magnification in the optical system leading from the document to the light-receiving elements; a color skew adjustment unit that adjusts positional skew in the sub scanning direction in scan data of each of the color components captured by the multiple line sensors in synchronization with the movement caused by the movement unit, in accordance with the corrected offset amount stored in the storage unit; and an image generating unit that generates image data expressing the document based on the scan data of each of the color components adjusted by the color skew adjustment unit. According to the image reading apparatus of the sixth application example, positional skew in the sub scanning direction in the scan data of each of the color components can be adjusted using the corrected offset amount corrected based on individual error in the optical system leading from the document to the light-receiving elements. As a result, color skew in the image data expressing the document can be suppressed.

Application Example 7

An image reading method according to a seventh application example is an image reading method for optically reading a document. The image reading method includes: capturing respective color components of respective line-shaped regions spanning in the main scanning direction of the document using multiple line sensors provided approximately parallel to each other and each having light-receiving elements arranged in line form; moving the positional relationship between the document and the multiple line sensors relative to the sub scanning direction that is orthogonal to the main scanning direction; adjusting color skew in the sub scanning direction in scan data of each of the color components captured by the multiple line sensors in synchronization with the movement carried out in the process of moving, in accordance with an offset amount based on the distance between each of the multiple line sensors; generating image data expressing the document based on the scan data of each of the color components adjusted in the process of adjusting; and correcting the offset amount used in the adjustment of the scan data based on a magnification change amount, the magnification change amount being the amount of change in the image formation magnification from a design value, an image of the document being formed upon the light-receiving elements. According to the image reading method of the seventh application example, the offset amount for adjusting positional skew in the sub scanning direction in the scan data of each of the color components can be corrected based on the magnification change amount of the image forming magnification, and thus color skew in the image data expressing the document can be suppressed.

Application Example 8

In the image reading method according to the seventh application example, the process of correcting may include: capturing, using the multiple line sensors, first and second markers provided at a basic distance from each other in positions in which the markers can be captured by the multiple line sensors; calculating an imaging distance indicating the distance between the first and second markers based on the image data obtained by reading the first and second markers using the multiple line sensors; and calculating the magnification change amount by comparing the basic distance with the imaging distance. According to the image reading method of an eighth application example, the magnification change amount can be calculated using the first and second markers as a reference.

Application Example 9

In the image reading method according to the seventh or eighth application examples, the process of correcting may be executed after the image reading apparatus has been started up and before the document is read. According to the image reading apparatus of a ninth application example, the offset amount can be corrected prior to reading a document.

Application Example 10

In the image reading method according to the seventh or eighth application examples, the process of correcting may be executed prior to the image reading apparatus being shipped. According to the image reading method of a tenth application example, the offset amount can be corrected based on individual error in the image forming magnification.

The aspects of the invention are not intended to be limited to an image reading apparatus and an image forming method, and the invention can be applied in other aspects as well, such as a method for adjusting an image reading apparatus, a program that causes a computer to realize a function for controlling an image reading apparatus, an adjustment apparatus that adjusts an image reading apparatus, and so on. Furthermore, the invention is not intended to be limited in any way to the aforementioned aspects, and it goes without saying that the invention can be achieved in various forms without departing from the spirit of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

An image reading apparatus (image scanner) to which the invention has been applied will be described hereinafter in order to make clear the configuration and effects of the invention described above.

A. First Embodiment

A1. Configuration of Image Scanner

Figure 1:
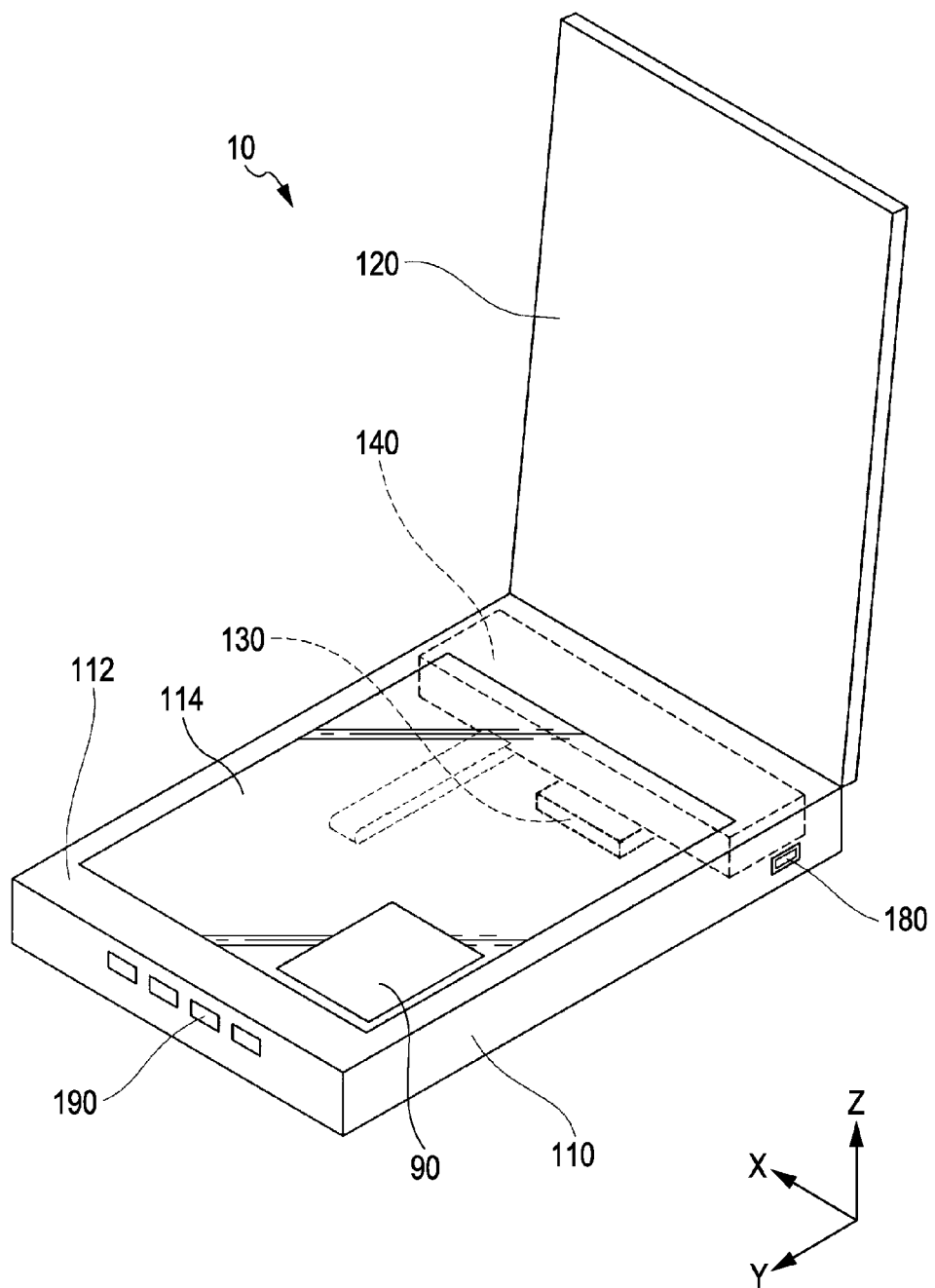
FIG. 1 is a descriptive diagram illustrating the external configuration of an image scanner.

FIG. 1 is a descriptive diagram illustrating the external configuration of an image scanner 10. The image scanner 10 is a flat-bed type image reading apparatus, and generates image data by optically reading a document 90. The image scanner 10 includes a main body housing 110, a cover body 120, a main control unit 130, an image reading unit 140, a device interface 180, and a user interface 190.

The main body housing 110 of the image scanner 10 houses the main control unit 130 and the image reading unit 140, and also configures a document plate 112 on which the document 90 is placed. The main body housing 110 includes, as part of the document plate 112, a transparent plane 114 formed of a transparent material, and the transparent plane 114 forms a holding plane that holds the document 90. In this embodiment, the main body housing 110 is a box housing having a rectangular shape; the document plate 112 is formed in the upper surface of the main body housing 110; and the transparent plane 114 is a colorless transparent glass of a rectangular shape that is smaller than the upper surface of the main body housing 110. In this embodiment, the transparent plane 114 is of a size capable of holding an A4-sized document 90.

In the descriptions of this embodiment, the direction moving toward the far side of the paper in FIG. 1 along the widthwise direction of the transparent plane 114 is defined as the X axis direction, the direction moving from the far side of the paper toward the front in FIG. 1 along the lengthwise direction of the transparent plane 114 is defined as the Y axis direction, and the direction moving toward the top of the transparent plane 114 orthogonal to the X axis direction and the Y axis direction is defined as the Z axis direction.

The cover body 120 of the image scanner 10 is a cover capable of exposing and covering the top of the document plate 112 formed in the main body housing 110. In this embodiment, the cover body 120 is a cover that is larger than the transparent plane 114 of the document plate 112, and is pivotally attached to the main body housing 110.

The main control unit 130 of the image scanner 10 is electrically connected to the image reading unit 140, the device interface 180, and the user interface 190, and controls the various elements within the image scanner 10. Details of the main control unit 130 will be given later.

The image reading unit 140 of the image scanner 10 optically reads the document 90 held on the transparent plane 114 of the document plate 112 by scanning the document 90 based on instructions from the main control unit 130. Details of the image reading unit 140 will be given later.

The device interface 180 of the image scanner 10 exchanges information with a different external device from the image scanner 10 (for example, a personal computer, a storage device, or the like). Although the device interface 180 is a USB (Universal Serial Bus)-compliant interface in this embodiment, the device interface 180 may, in another embodiment, be an interface that connects to a network.

The user interface 190 of the image scanner 10 exchanges information with a user who uses the image scanner 10. In this embodiment, the user interface 190 includes operational buttons that accept operational inputs from the user, but the user interface 190 may, in another embodiment, further include an image display unit that displays various information to the user.

Figure 2:
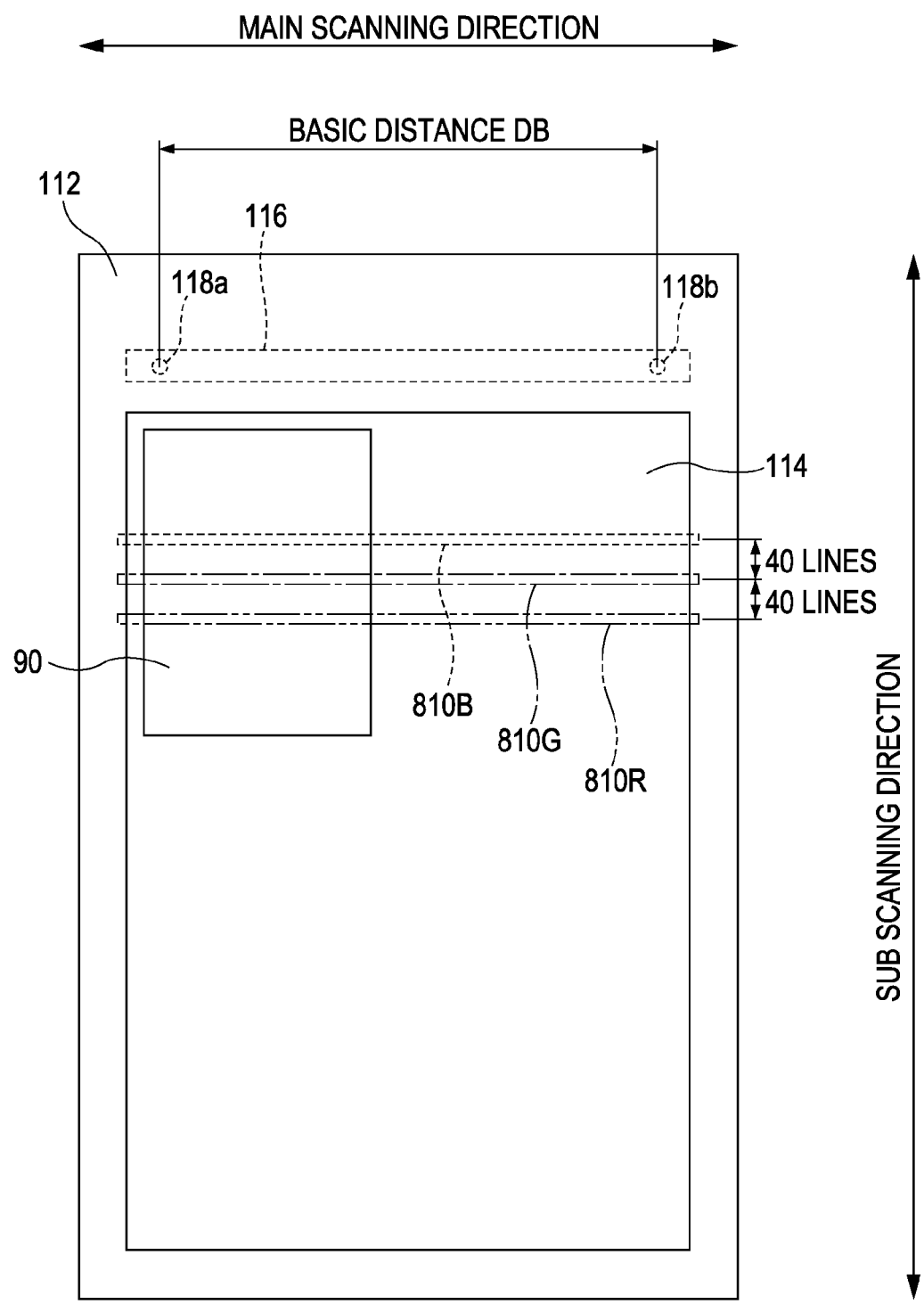
FIG. 2 is a descriptive diagram primarily illustrating the configuration of a document plate as viewed from the Z axis direction.

FIG. 2 is a descriptive diagram primarily illustrating the configuration of the document plate 112 as viewed from the Z axis direction. In the descriptions of this embodiment, the X axis direction is also referred to as the "main scanning direction", and the Y axis direction is also referred to as the "sub scanning direction". A reference plane 116 is formed on the back surface of the document plate 112, which is on the inner side of the main body housing 110, upon the same plane as the surface of the transparent plane 114 that makes contact with the document 90. First and second markers 118a and 118b are provided in the reference plane 116 in positions that can be read by the image reading unit 140, at a basic distance DB from each other. In this embodiment, the first and second markers 118a and 118b are provided along the main scanning direction. Any markers may be used as the first and second markers 118a and 118b as long as the markers can be read by the image reading unit 140, and although the markers 118a and 118b are point-shaped figures inscribed upon the reference plane 116 in this embodiment, the markers 118a and 118b may, in another embodiment, be notches cut out from the reference plane 116, or may be figures formed in the reference plane 116 as indentations or nubs.

Figure 3:
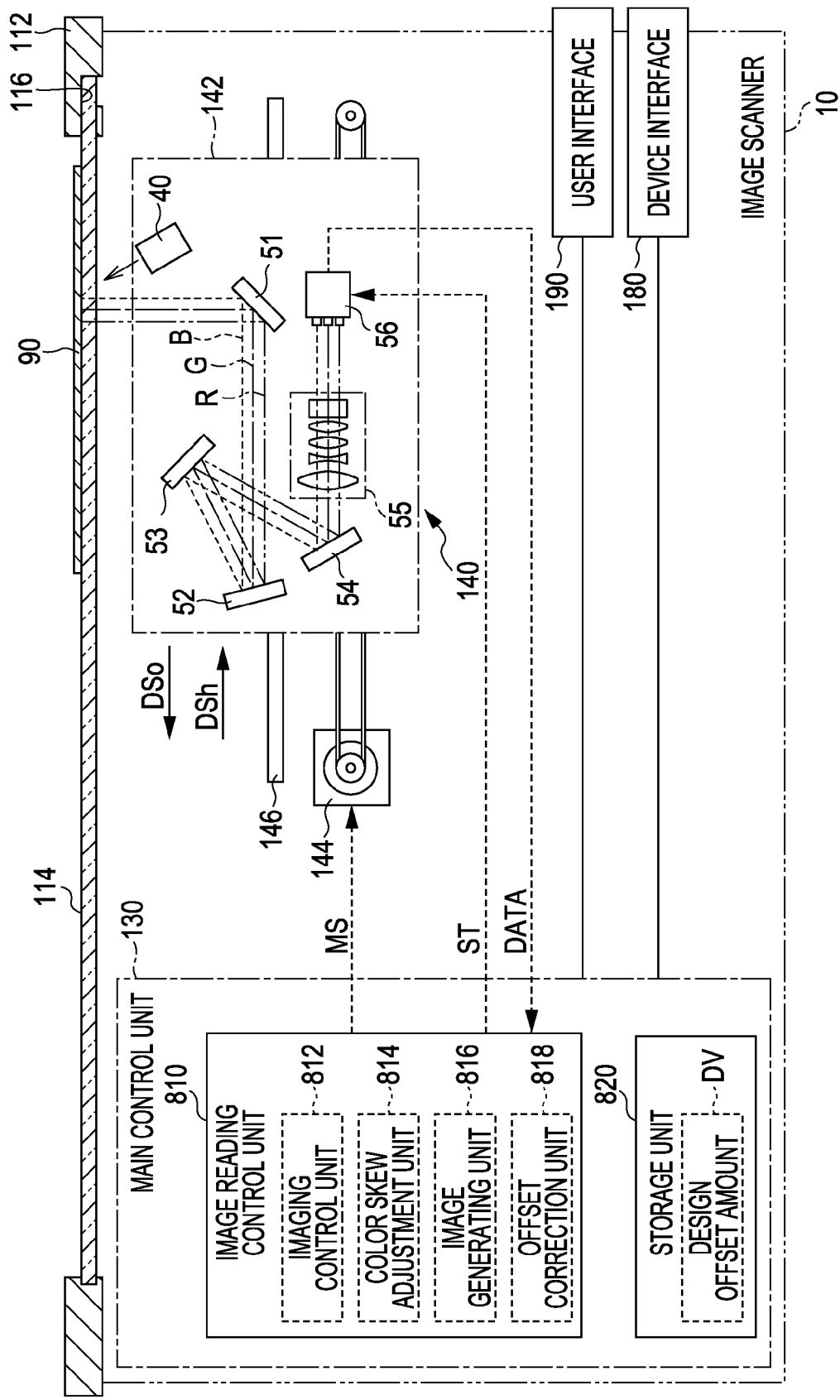
FIG. 3 is a descriptive diagram illustrating the configuration of an image scanner in detail.

FIG. 3 is a descriptive diagram illustrating the configuration of the image scanner 10 in detail. The image reading unit 140 of the image scanner 10 includes a carriage 142, a transport mechanism unit 144, and a guide shaft 146. The carriage 142 of the image reading unit 140 includes various constituent elements for optically reading the document 90, and is a reciprocating member capable of moving back and forth relative to the document 90 along the primary path of the sub scanning direction DSo, which is the positive direction in the Y axis direction, and along the secondary path of the sub scanning direction DSh, which is the negative direction in the Y axis direction. The guide shaft 146 of the image reading unit 140 is a shaft that follows the sub scanning directions DSo and DSh, and holds the carriage 142 that reciprocates along the sub scanning directions DSo and DSh. The transport mechanism unit 144 of the image reading unit 140 is a movement unit that causes the carriage 142 to move relative to the document 90 at a set step width along the sub scanning directions DSo and DSh, based on instructions from the main control unit 130. In this embodiment, the transport mechanism unit 144 operates based on a control signal MS outputted from the main control unit 130. Furthermore, in this embodiment, the transport mechanism unit 144 is a belt-drive transport mechanism including a driving motor, a timing belt, pulleys, and so on.

The image reading unit 140 includes, as various constituent elements provided in the carriage 142, a document illumination unit 40, reflection mirrors 51, 52, 53, and 54, a lens unit 55, and an imaging unit 56. The document illumination unit 40 of the image reading unit 140 illuminates the document 90. Some of the light emitted from the document illumination unit 40 is reflected by the surface of the document 90, and then proceeds to the reflection mirrors 51, 52, 53, and 54. The reflection mirrors 51, 52, 53, and 54 of the image reading unit 140 reflect the light from the document 90 to the lens unit 55. The lens unit 55 of the image reading unit 140 includes multiple lenses arranged in a single row, and forms the light from the reflection mirror 54 as an image upon the imaging unit 56. In this embodiment, the light that reaches the imaging unit 56 from the document 90 reaches the lens unit 55 via the reflection mirrors 51, 52, 53, and 54, in that order. The imaging unit 56 of the image reading unit 140 generates scan data expressing the document 90 as individual multiple color components by capturing the light formed by the lens unit 55 based on a control signal ST outputted from the main control unit 130.

Figure 4:
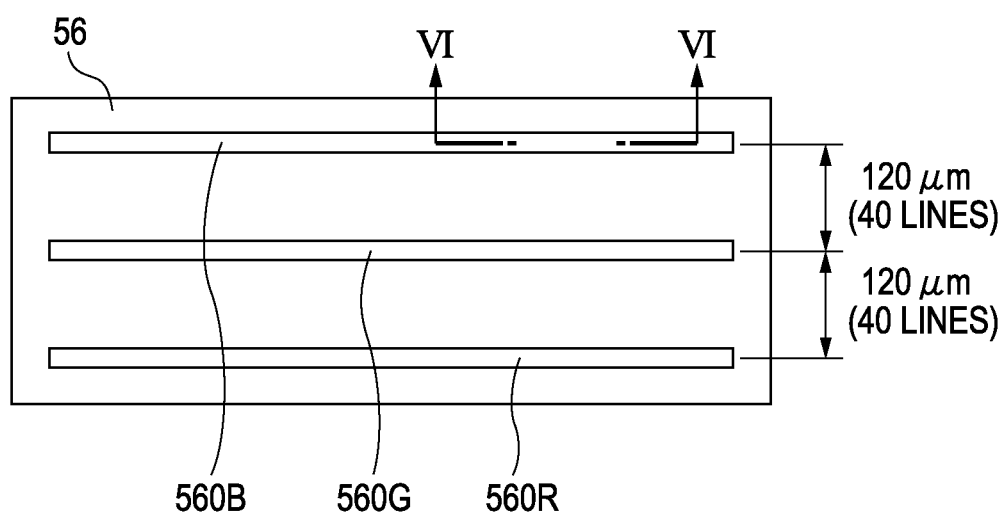
FIG. 4 is a descriptive diagram illustrating the configuration of an imaging unit in an image reading unit in detail.

FIG. 4 is a descriptive diagram illustrating the configuration of the imaging unit 56 in the image reading unit 140 in detail. The imaging unit 56 includes multiple line sensors 560 that photoelectrically convert light of different color components. In this embodiment, the imaging unit 56 includes three types of line sensors, or line sensors 560R, 560G, and 560B, that photoelectrically convert the light of red, green, and blue color components, respectively. The line sensors 560R, 560G, and 560B of the imaging unit 56 are provided at equal intervals from and approximately parallel to each other. In this embodiment, the interval between each of the line sensors 560R, 560G, and 560B is 120 μm (micrometers).

As shown in FIG. 2, the line sensors 560R, 560G, and 560B of the imaging unit 56 capture different color components of mutually different line-shaped regions 810R, 810G, and 810B, respectively, that follow the main scanning direction in the document 90. The line-shaped regions 810R, 810G, and 810B are in a positional relationship in which each is skewed in the sub scanning direction due to the intervals between the line sensors 560R, 560G, and 560B. In this embodiment, the optical resolution of the line sensors 560R, 560G, and 560B is 600 dpi (dots per inch), and the line-shaped regions 810R, 810G, and 810B are expressed as scan data in which 600 pixels are arranged per inch in the main scanning direction.

Figure 5:
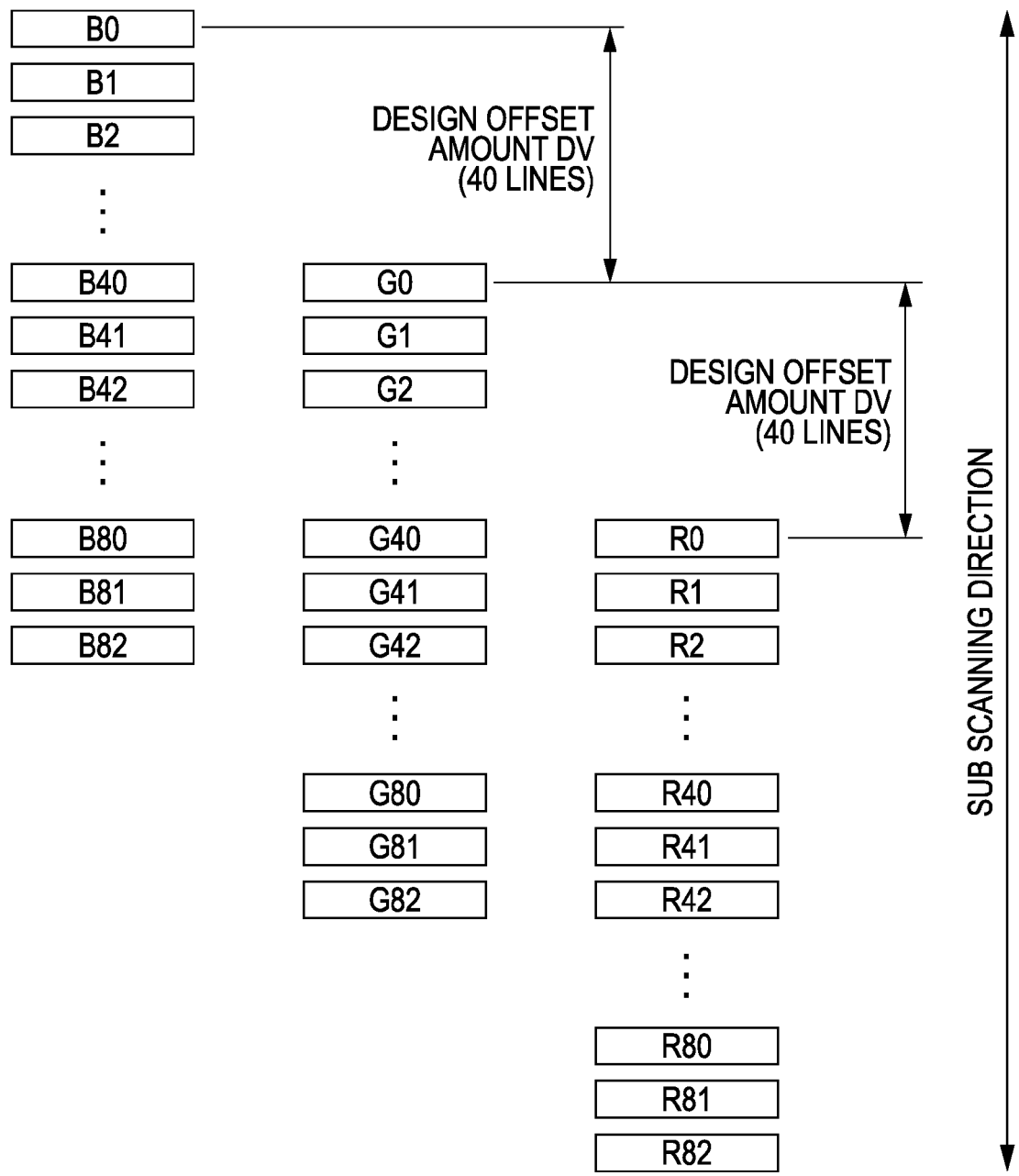
FIG. 5 is a descriptive diagram schematically illustrating the structure of scan data generated by an imaging unit.

FIG. 5 is a descriptive diagram schematically illustrating the structure of scan data generated by the imaging unit 56. Scan data B0, B1, B2, and so on up to B82 indicates scan data of the blue color component resulting from the line sensor 560B capturing multiple line-shaped regions 810B skewed in the sub scanning direction at the same resolution (600 dpi) as the optical resolution of the line sensor 560B. Meanwhile, scan data G0, G1, G2, and so on up to G82 indicates scan data of the green color component resulting from the line sensor 560G capturing multiple line-shaped regions 810G skewed in the sub scanning direction at the same resolution (600 dpi) as the optical resolution of the line sensor 560G. Finally, scan data R0, R1, R2, and so on up to R82 indicates scan data of the red color component resulting from the line sensor 560R capturing multiple line-shaped regions 810R skewed in the sub scanning direction at the same resolution (600 dpi) as the optical resolution of the line sensor 560R.

Of the scan data shown in FIG. 5, the scan data to which the same numerals have been assigned indicates scan data that is captured at the same timing, and thus, for example, the scan data B0, G0, and R0 are captured at the same timing. Of the scan data captured by the line sensors 560R, 560G, and 560B, positional skew in the sub scanning direction in scan data that expresses the same line-shaped region (line) is set as a design offset amount, and in the example shown in FIG. 5, where the document 90 is read at an interval of 600 dpi in the sub scanning direction, the design is such that the design offset value is an interval equivalent to 40 line-shaped regions, or in other words, 40 lines. For example, each of the blue color component scan data B80, the green color component scan data G40, and the red color component scan data R40 express the same line-shaped region (line) in the document 90.

In the descriptions of this embodiment, the reference numeral "560" is used when generally indicating the line sensors of the imaging unit 56, whereas "560R, 560G, and 560B" is used when indicating the individual line sensors corresponding to the respective color components. Although in this embodiment, the imaging unit 56 includes a total of three line sensors 560, with each of the three types of line sensors 560 corresponding to a respective red, green, or blue color component, two or more line sensors 560 may be provided for each color component in another embodiment. Furthermore, although in this embodiment, the imaging unit 56 includes line sensors 560 corresponding to each color component, or red, green, and blue, that expresses the RGB color system, line sensors 560 corresponding to the color components that express another color system, such as the CMYK color system, may be provided in another embodiment.

Figure 6:
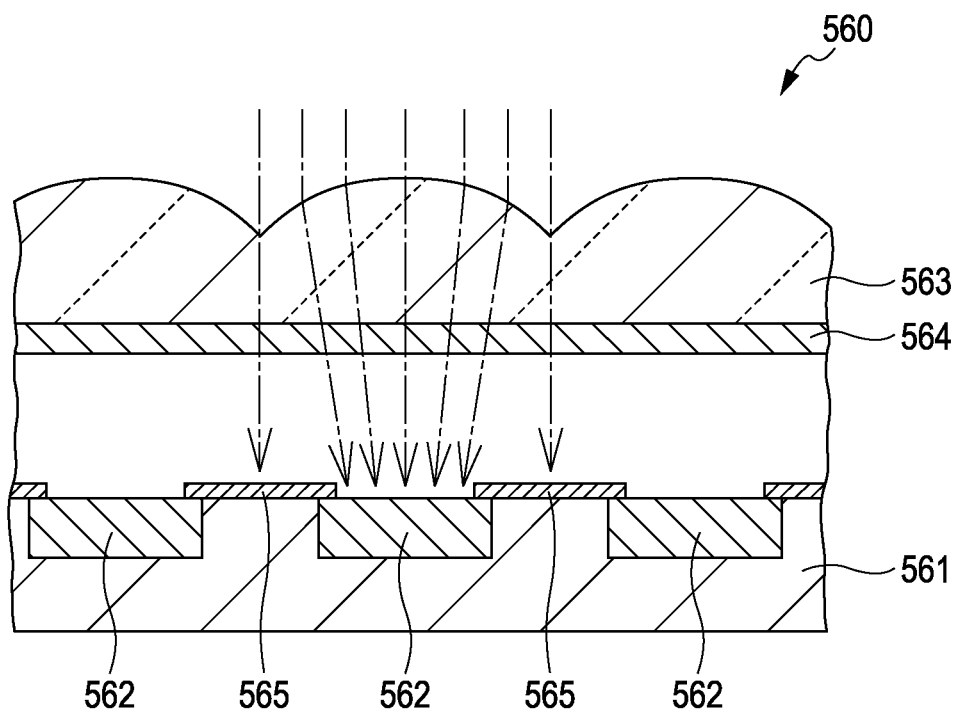
FIG. 6 is a descriptive diagram illustrating a cross-section in which a line sensor has been split in the lengthwise direction along the line VI-VI shown in FIG. 4.

FIG. 6 is a descriptive diagram illustrating a cross-section in which a line sensor 560 has been split in the lengthwise direction along the line VI-VI shown in FIG. 4. The line sensor 560 includes a silicon substrate 561, light-receiving elements 562, microlenses 563, a color filter 564, and light-blocking films 565. In each line sensor 560, multiple light-receiving elements 562 are formed arranged in a line upon the silicon substrate 561. Although the light-receiving elements 562 are CCDs (Charge Coupled Devices) in this embodiment, the light-receiving elements 562 may be other light-receiving elements, such as CMOSs (Complementary Metal Oxide Semiconductors), in another embodiment.

The microlenses 563 of the line sensor 560 concentrate light from the lens unit 55 upon corresponding light-receiving elements 562. The color filter 564 of the line sensor 560 is provided between the microlenses 563 and the light-receiving elements 562, and selectively allows light of a target color component that is to undergo photoelectric conversion in the line sensor 560 to pass. In this embodiment, the color filter 564 in the line sensor 560B selectively allows the blue color component contained in the light from the lens unit 55 to pass, the color filter 564 in the line sensor 560G selectively allows the green color component contained in the light from the lens unit 55 to pass, and the color filter 564 in the line sensor 560R selectively allows the red color component contained in the light from the lens unit 55 to pass.

Returning to the descriptions of FIG. 3, the main control unit 130 of the image scanner 10 includes an image reading control unit 810 that controls the image reading unit 140 and a storage unit 820 that stores various types of data. A design offset amount DV, indicating the positional skew in the sub scanning direction in the scan data of each of the color components as captured by the line sensors 560R, 560G, and 560B, is saved in advance in the storage unit 820 of the main control unit 130 prior to the image scanner 10 being shipped from the factory.

The image reading control unit 810 of the main control unit 130 includes an imaging control unit 812, a color skew adjustment unit 814, an image generating unit 816, and an offset correction unit 818. In this embodiment, the functionality of the image reading control unit 810 is realized by operations performed by a central processing unit (called a "CPU" hereinafter) based on a program, but in another embodiment, at least part of the functionality of the image reading control unit 810 may be realized by the electronic circuitry of the main control unit 130 operating based on the physical circuit configuration thereof.

The imaging control unit 812 of the image reading control unit 810 controls the movement of the carriage 142 performed by the transport mechanism unit 144, and controls the imaging of the document 90 by the imaging unit 56 in synchronization with the movement of the carriage 142. The color skew adjustment unit 814 of the image reading control unit 810 adjusts positional skew in the sub scanning direction in the scan data of each of the color components as captured by the line sensors 560R, 560G, and 560B in accordance with the design offset amount DV based on the distance between the line sensors 560R, 560G, and 560B. The image generating unit 816 of the image reading control unit 810 generates image data expressing the document 90 based on the scan data of the color components adjusted by the color skew adjustment unit 814. The offset correction unit 818 of the image reading control unit 810 corrects the design offset amount DV used in the adjustment of the scan data performed by the color skew adjustment unit 814 in accordance with a magnification change amount, which is the amount of change in the image formation magnification, at which the image of the document 90 is formed upon the light-receiving elements 562, from the design value.

A2. Operations of Image Scanner

Figure 7:
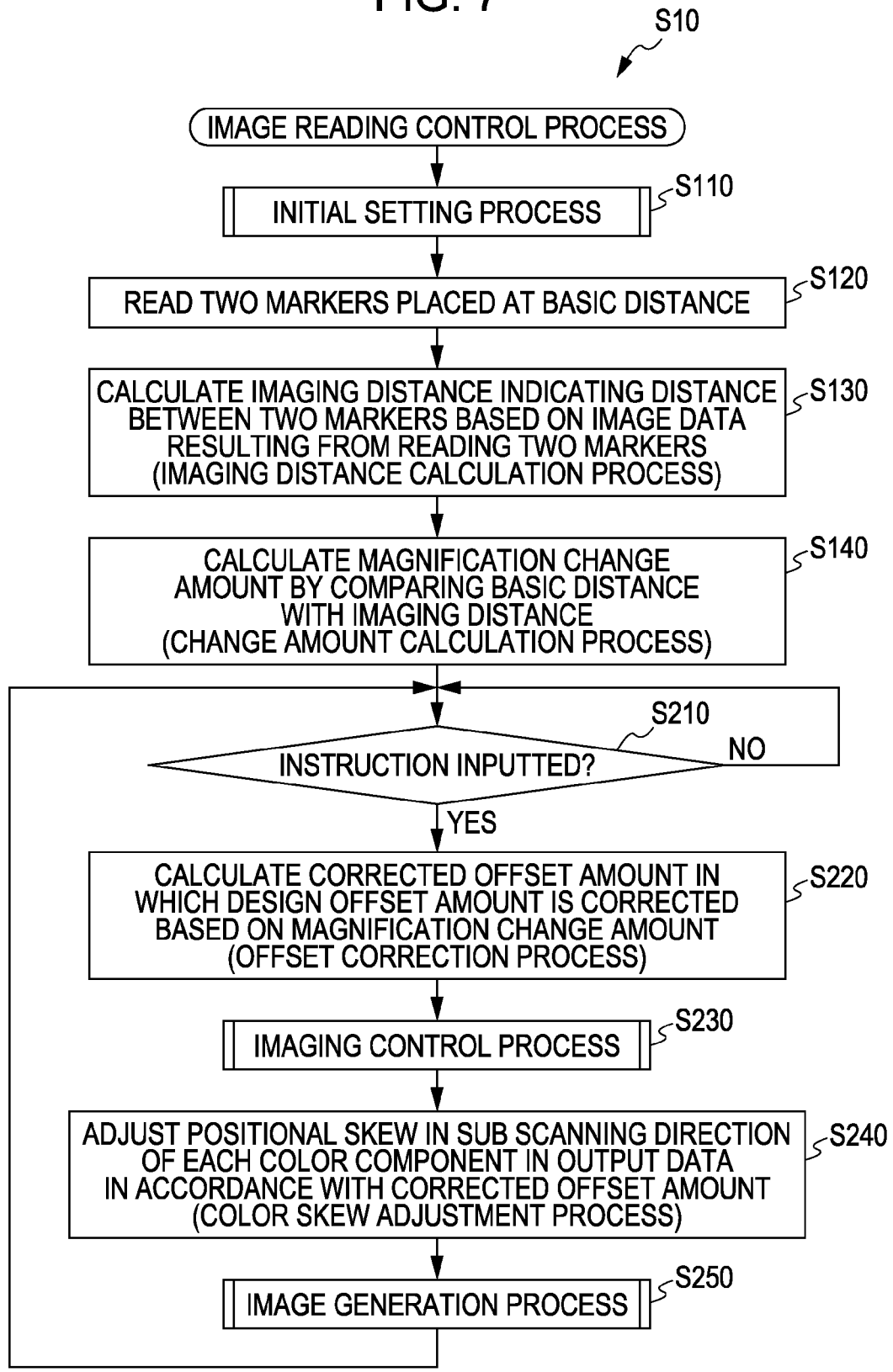
FIG. 7 is a flowchart illustrating an image reading control process executed by a main control unit of an image scanner.

FIG. 7 is a flowchart illustrating an image reading control process (S10) executed by the main control unit 130 of the image scanner 10. The image reading control process (S10) is a process implemented by the image reading control unit 810 of the main control unit 130. In this embodiment, the main control unit 130 commences the image reading control process (S10) when the power to the image scanner 10 is turned on.

When the image reading control process (S10) is commenced, the main control unit 130 of the image scanner 10 executes an initial setting process (S110). In the initial setting process (S110), the main control unit 130 adjusts the image reading unit 140. In this embodiment, after adjusting the amount and emission distribution of the light emitted from the document illumination unit 40 and adjusting the black level output from the line sensors 560R, 560G, and 560B, the main control unit 130 moves the carriage 142 to a standby position. In this embodiment, the standby position to which the carriage 142 is moved in the initial setting process (S110) is a position at which the first and second markers 118a and 118b provided in the reference plane 116 of the main body housing 110 can be read.

After the initial setting process (S110), the main control unit 130 reads the first and second markers 118a and 118b via the image reading unit 140 (S120).

After reading the first and second markers 118a and 118b (S120), the main control unit 130 executes an imaging distance calculation process by operating as an imaging distance calculation unit (S130). In the imaging distance calculation process (S130), the main control unit 130 calculates, based on image data obtained by reading the first and second markers 118a and 118b, an imaging distance DR indicating the distance between the first marker 118a and the second marker 118b in that image data.

After the imaging distance calculation process (S130), the main control unit 130 executes a change amount calculation process (S140) by operating as a change amount calculation unit. In the change amount calculation process (S140), the main control unit 130 calculates a magnification change amount ME, which is the amount of change in the image formation magnification, at which the image of the document 90 is formed upon the light-receiving elements 562, from the design value, by comparing the imaging distance DR calculated in the imaging distance calculation process (S130) with the basic distance DB, which is a value between the first marker 118a and the second marker 118b that is already known. The magnification change amount ME is calculated based on the following Equation 1.

$$ME = (DR - DB)/DB \tag{1}$$

After the change amount calculation process (S140), the main control unit 130 stands by until the input of an instruction from a user, instructing the document 90 to be read, is accepted via the user interface 190 ("NO" in S210).

In the case where the input of an instruction from the user has been accepted via the user interface 190 ("YES" in S210), the main control unit 130 executes an offset correction process (S220) by operating as the offset correction unit 818, which is a first correction unit. In the offset correction process (S220), the main control unit 130 calculates a corrected offset amount AV by correcting the design offset amount DV stored in the storage unit 820 based on the magnification change amount ME calculated in the change amount calculation process (S140). The corrected offset amount AV is calculated based on the following Equation 2.

$$AV = \{DV - (DV \times ME)\} \times (RS/RB) \tag{2}$$

"RS" in Equation 2 indicates an executed scanning resolution, which is the reading resolution in the sub scanning direction for the reading of the document 90 executed at this time. Meanwhile, "RB" in Equation 2 indicates a basic scanning resolution, which is the reading resolution in the sub scanning direction designed in correspondence with the design offset amount DV, and in this embodiment, the basic scanning resolution is set to 600 dpi.

For example, in the case where the design offset amount DV is "40 lines", the magnification change amount ME is "0.1", the executed scanning resolution RS is "600 dpi", and the basic scanning resolution RB is "600 dpi", the corrected offset amount AV is calculated as "36 lines" based on Equation 2. Meanwhile, for example, in the case where the design offset amount DV is "40 lines", the magnification change amount ME is "0.1", the executed scanning resolution RS is "1200 dpi", and the basic scanning resolution RB is "600 dpi", the corrected offset amount AV is calculated as "72 lines" based on Equation 2.

After the offset correction process (S220), the main control unit 130 executes an imaging control process (S230) by operating as the imaging control unit 812. In the imaging control process (S230), the main control unit 130 controls the movement of the carriage 142 performed by the transport mechanism unit 144, and controls the imaging of the document 90 by the imaging unit 56 in synchronization with the movement of the carriage 142.

After the imaging control process (S230), the main control unit 130 executes a color skew adjustment process (S240) by operating as the color skew adjustment unit 814. In the color skew adjustment process (S240), based on the corrected offset amount AV calculated in the offset correction process (S220), the main control unit 130 adjusts the positional skew in the scan data of each of the color components as captured by the line sensors 560R, 560G, and 560B of the imaging unit 56 during the imaging control process (S230).

After the color skew adjustment process (S240), the main control unit 130 executes an image generation process (S250) by operating as the image generating unit 816. In the image generation process (S250), the main control unit 130 generates image data expressing the document 90 based on the scan data of each of the color components, adjusted in the color skew adjustment process (S240). In this embodiment, the main control unit 130 outputs the image data generated in the image generation process (S250) to an external device (not shown) via the device interface 180.

After the image generation process (S250), the main control unit 130 once again stands by until the input of an instruction from a user is accepted via the user interface 190 ("NO" in S210), and when the input of an instruction from a user is accepted via the user interface 190 ("YES" in S210), the processing from the offset correction process (S220) is repeated.

A3. Effects

According to the image scanner 10 of the first embodiment, the design offset amount DV for adjusting the positional skew in the sub scanning direction of the scan data of each of the color components as captured by the line sensors 560R, 560G, and 560B can be corrected based on the magnification change amount ME of the image formation magnification, and thus color skew in the image data expressing the document 90 can be suppressed.

Furthermore, the offset correction process (S220) is carried out after the image scanner 10 is started up and before the imaging control process (S230), thus making it possible to correct the design offset amount DV prior to reading the document 90.

Further still, because the design offset amount DV is corrected based on the imaging of the first and second markers 118a and 118b (S120, S130 and S220), the design offset amount DV can be corrected based on the magnification change amount ME, which arises due to individual error in the optical magnification, deterioration due to age, and so on of the optical system leading from the document 90 to the light-receiving element 562.

A4. First Variation

The image scanner 10 according to the first variation reads light reflected from a document in the case where the document is a reflective document that reflects light (for example, paper, a book, or the like), and reads light that has passed through a document in the case where the document is a transparent document that allows light to pass through (for example, a photographic film). Aside from the reading of a transparent document and the adjustment of scan data using a different offset amount from the reflective document when reading a transparent document, the image scanner 10 of the first variation is the same as that described in the aforementioned first embodiment.

Figure 8:
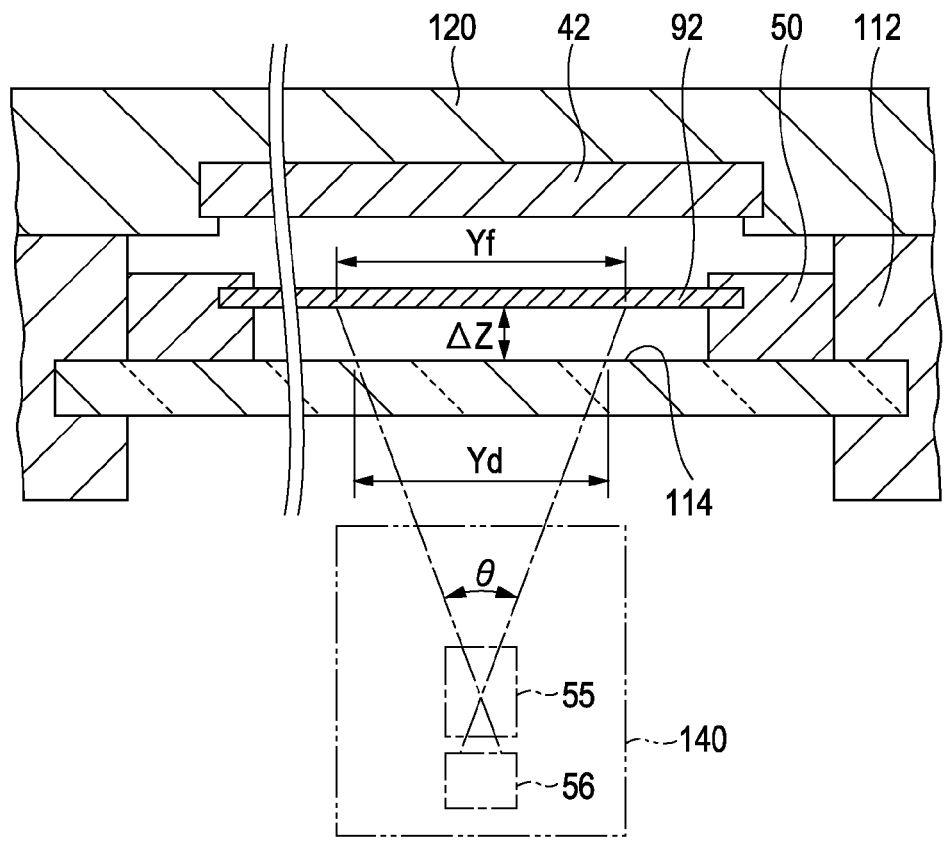
FIG. 8 is a descriptive diagram illustrating a structure that holds a transparent document according to a first variation on the first embodiment.

FIG. 8 is a descriptive diagram illustrating a structure that holds a transparent document according to the first variation on the first embodiment. The configuration of the image scanner 10 of the first variation is the same as that of the first embodiment aside from the inclusion of a film holder 50 and a transparent light source unit 42.

The film holder 50 of the image scanner 10 is a holding apparatus, installed on the transparent plane 114 of the document plate 112, that holds photographic film 92, which is an example of a transparent document, in a manner in which the photographic film 92 can be read by the image reading unit 140. The film holder 50 holds the photographic film 92 in a position at an interval distance $\Delta Z$ in the Z axis direction from the surface of the transparent plane 114.

The transparent light source unit 42 of the image scanner 10 is provided on the surface of the cover body 120 that opposes the document plate 112, and irradiates the photographic film 92, held by the film holder 50 in the document plate 112, with light. The light irradiated from the transparent light source unit 42 is captured by the image reading unit 140 after passing through the photographic film 92 held by the film holder 50.

Aside from a different method for calculating the corrected offset amount in the offset correction process (S220), the operations of the image scanner 10 in the first variation are the same as those in the first embodiment. In the offset correction process (S220) of the first variation, in the case where the inputted instruction from the user indicates that the photographic film 92 is to be read, the main control unit 130 operates as a second correction unit, and calculates the corrected offset amount AV based on the following Equation 3, rather than the aforementioned Equation 2.

$$AV = [DV - \{DV \times (ME - \alpha)\}] \times (RS/RB) \quad (3)$$

"$\alpha$" in Equation 3 indicates the magnification change amount arising due to the distance between the document and the transparent plane 114, and is calculated based on the following Equation 4.

$$\alpha = Yf / Yd \quad (4)$$
$$= \{2 \times \tan(\theta/2) \times \Delta Z\} / Yd$$

In Equation 4, "Yf" indicates the distance in the Y axis direction at which the photographic film 92 held by the film holder 50 can be captured by the lens unit 55, and "Yd" indicates the distance in the Y axis direction at which the document 90 placed upon the transparent plane 114 can be captured by the lens unit 55. "$\theta$" in Equation 4 indicates the angle of view of the lens unit 55.

According to the image scanner 10 of the first variation, the design offset amount DV for adjusting the positional skew in the sub scanning direction of the scan data of each of the color components as captured by the line sensors 560R, 560G, and 560B can be corrected based on the magnification change amount a arising due to the distance between the document and the transparent plane 114 in addition to the magnification change amount ME arising due to individual error in the optical magnification, deterioration due to age, and so on of the optical system, and thus color skew in image data expressing both a reflective document and a transparent document can be suppressed.

A5. Second Variation

The image scanner 10 according to a second variation includes an autofocus function for focusing on the document 90, and adjusts the design offset amount DV in accordance with a magnification change amount in the optical magnification based on the autofocus function in addition to the magnification change amount ME arising due to individual error in the optical magnification, deterioration due to age, and so on of the optical system; aside from this, the image scanner 10 is the same as that of the first embodiment.

Figure 9:
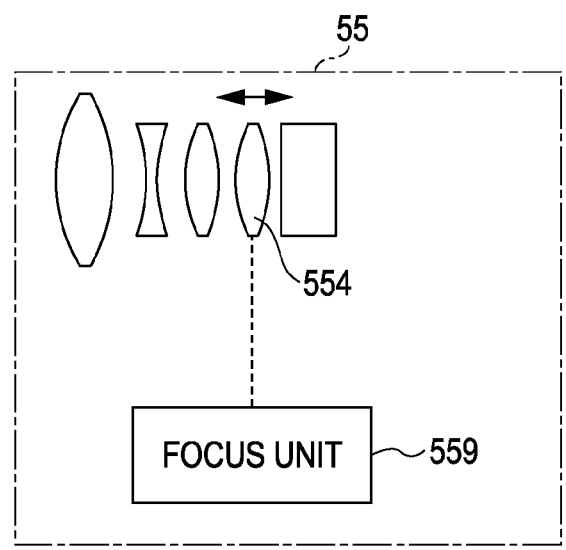
FIG. 9 is a descriptive diagram illustrating a lens unit according to a second variation on the first embodiment.

FIG. 9 is a descriptive diagram illustrating the lens unit 55 according to the second variation on the first embodiment. The lens unit 55 of the second variation includes a focus lens 554 and a focus unit 559. The focus lens 554 of the lens unit 55 is one of the lenses of which the lens unit 55 is configured, and is provided so as to be movable along the optical axis of the lens unit 55. The focus unit 559 of the lens unit 55 moves the focus lens 554 to a position in which the document 90 is in focus. In this embodiment, the focus unit 559 realizes an active autofocus, but the focus unit 559 may realize a passive autofocus in another embodiment.

Aside from a different method for calculating the corrected offset amount in the offset correction process (S220), the operations of the image scanner 10 in the second variation are the same as those in the first embodiment. In the offset correction process (S220) of the second variation, the main control unit 130 operates as a third correction unit, and calculates the corrected offset amount AV using a magnification change amount ME increased/decreased in accordance with the amount by which the focus lens 554 has been moved by the focus unit 559.

According to the image scanner 10 of the second variation, the design offset amount DV for adjusting the positional skew in the sub scanning direction of the scan data of each of the color components as captured by the line sensors 560R, 560G, and 560B can be corrected based on the magnification change amount arising due to the movement of the focus lens 554 by the focus unit 559 in addition to the magnification change amount ME arising due to individual error in the optical magnification, deterioration due to age, and so on of the optical system, and thus color skew caused by the autofocus function can be suppressed.

B. Second Embodiment

An image scanner 12 according to a second embodiment is the same as the image scanner 10 according to the first embodiment, aside from the positional skew in the sub scanning direction in the scan data being adjusted based on an offset amount corrected in advance, prior to the image scanner 12 being shipped, based on individual error in the optical system.

Figure 10:
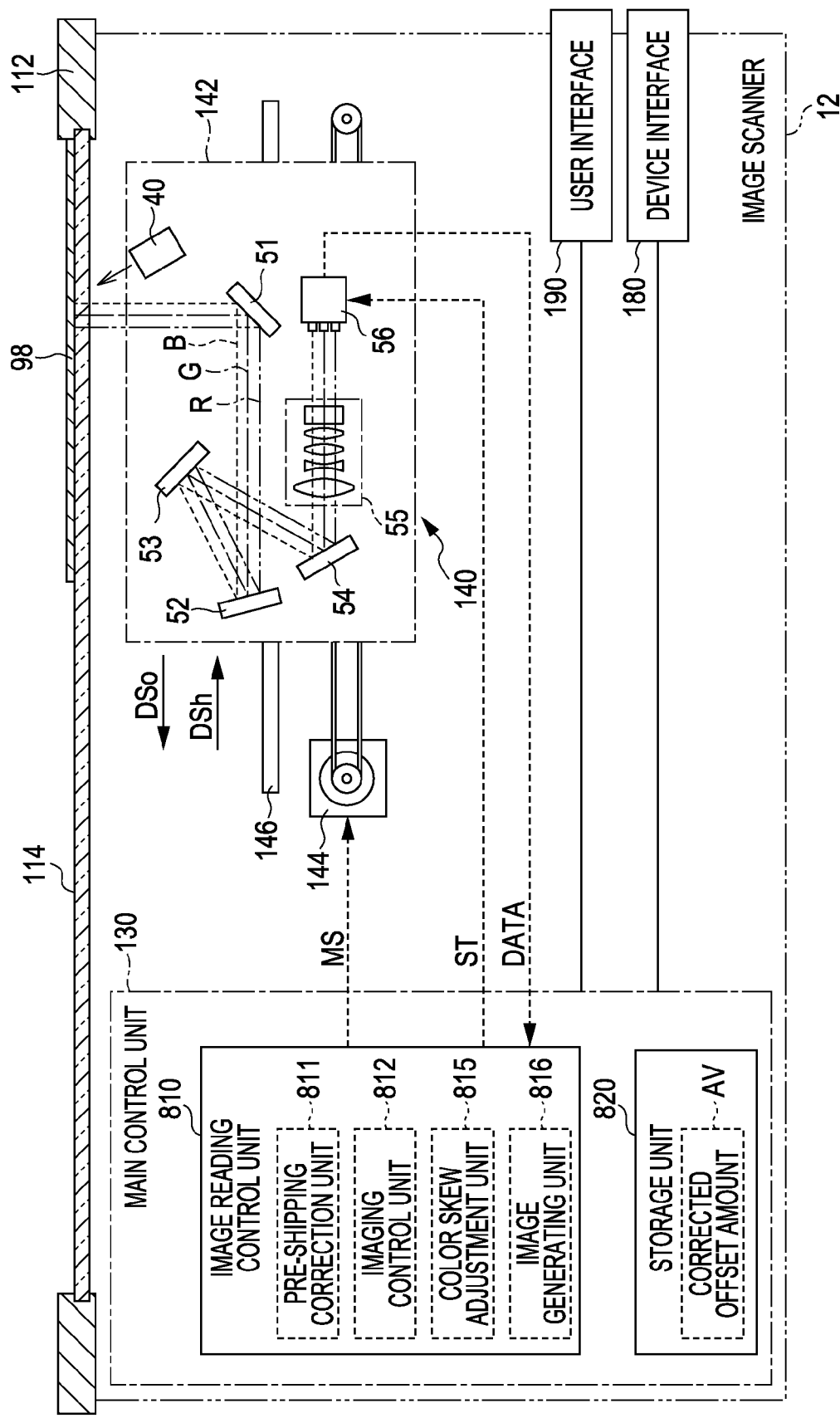
FIG. 10 is a descriptive diagram illustrating the configuration of an image scanner in detail according to a second embodiment.

FIG. 10 is a descriptive diagram illustrating the configuration of the image scanner 12 according to the second embodiment in detail. A main control unit 130 of the image scanner 12 includes the image reading control unit 810 that controls an image reading unit 140 and the storage unit 820 that stores various types of data. The corrected offset amount AV in which a design offset amount DV has been corrected is saved in the storage unit 820 of the main control unit 130 in advance, prior to the image scanner 12 being shipped.

The image reading control unit 810 of the main control unit 130 includes a pre-shipping correction unit 811 and a color skew adjustment unit 815 in addition to the imaging control unit 812 and the image generating unit 816. The pre-shipping correction unit 811 of the image reading control unit 810 calculates the corrected offset amount AV and saves the calculated corrected offset amount AV in the storage unit 820 prior to the image scanner 12 being shipped. The color skew adjustment unit 815 of the image reading control unit 810 adjusts the positional skew in the sub scanning direction of the scan data of each of the color components as captured by the line sensors 560R, 560G, and 560B based on the corrected offset amount AV stored in the storage unit 820.

Figure 11:
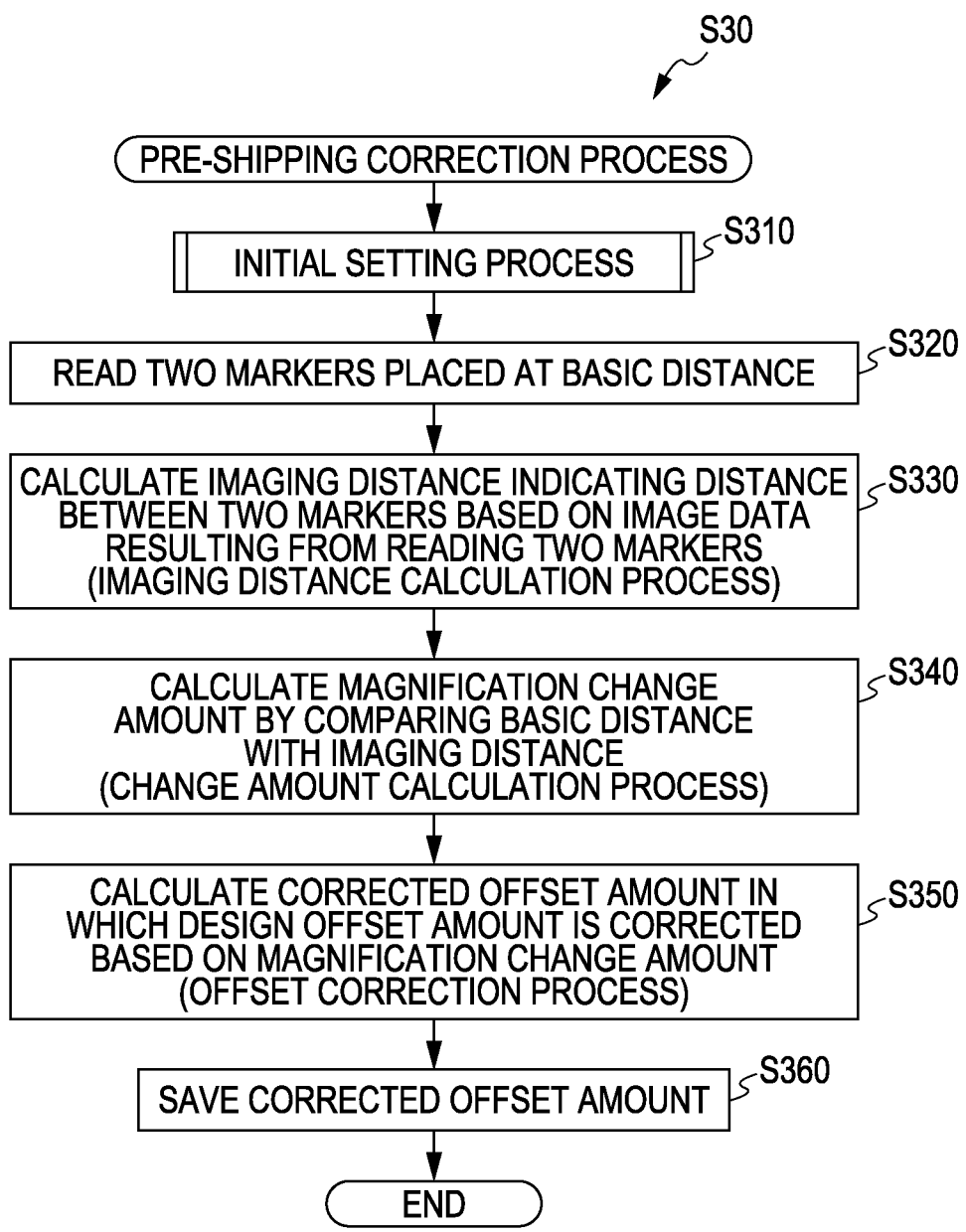
FIG. 11 is a flowchart illustrating a pre-shipping correction process executed by a main control unit of an image scanner according to the second embodiment.

FIG. 11 is a flowchart illustrating a pre-shipping correction process (S30) executed by the main control unit 130 of the image scanner 12 according to the second embodiment. The pre-shipping correction process (S30) is a process implemented by the image reading control unit 810 of the main control unit 130. In this embodiment, the main control unit 130 commences the pre-shipping correction process (S30) as a part of pre-shipping operation testing.

When the pre-shipping correction process (S30) is commenced, the main control unit 130 of the image scanner 12 executes an initial setting process (S310). In the initial setting process (S310), the main control unit 130 adjusts the image reading unit 140. In this embodiment, after adjusting the amount and emission distribution of the light emitted from the document illumination unit 40 and adjusting the black level output from the line sensors 560R, 560G, and 560B, the main control unit 130 moves the carriage 142 to a standby position.

In this embodiment, a test document 98 is placed, by an operator, on the transparent plane 114 of the document plate 112 by the time the initial setting process (S310) is performed. The test document 98 is provided with first and second markers 118a and 118b located a basic distance DB from each other. Note that the test document 98 need not be placed in the case where the first and second markers 118a and 118b are provided in the reference plane 116 of the main body housing 110, as in the first embodiment.

After the initial setting process (S310), the main control unit 130 reads the first and second markers 118a and 118b via the image reading unit 140 (S320).

After reading the first and second markers 118a and 118b (S320), the main control unit 130 executes an imaging distance calculation process (S330) by operating as an imaging distance calculation unit. In the imaging distance calculation process (S330), the main control unit 130 calculates, based on image data obtained by reading the first and second markers 118a and 118b, an imaging distance DR indicating the distance between the first marker 118a and the second marker 118b in that image data.

After the imaging distance calculation process (S330), the main control unit 130 executes a change amount calculation process (S340) by operating as a change amount calculation unit. In the change amount calculation process (S340), the main control unit 130 calculates a magnification change amount ME, which is the amount of change in the image formation magnification, at which the image of the document 90 is formed upon the light-receiving elements 562, from the design value, by comparing the imaging distance DR calculated in the imaging distance calculation process (S330) with the basic distance DB, which is a value between the first marker 118a and the second marker 118b that is already known. The magnification change amount ME is calculated based on the aforementioned Equation 1.

After the change amount calculation process (S340), the main control unit 130 executes an offset correction process (S350) by operating as the pre-shipping correction unit 811. In the offset correction process (S350), the main control unit 130 calculates a corrected offset amount AV by correcting the design offset amount DV based on the magnification change amount ME calculated in the change amount calculation process (S340). The corrected offset amount AV is calculated based on the aforementioned Equation 2. In the offset correction process (S350), the executed scanning resolution RS and the basic scanning resolution RB are handled as the same numerical values.

After the offset correction process (S350), the main control unit 130 saves the corrected offset amount AV calculated in the offset correction process (S350) in the storage unit 820 (S360). After this, the main control unit 130 ends the pre-shipping correction process.

Figure 12:
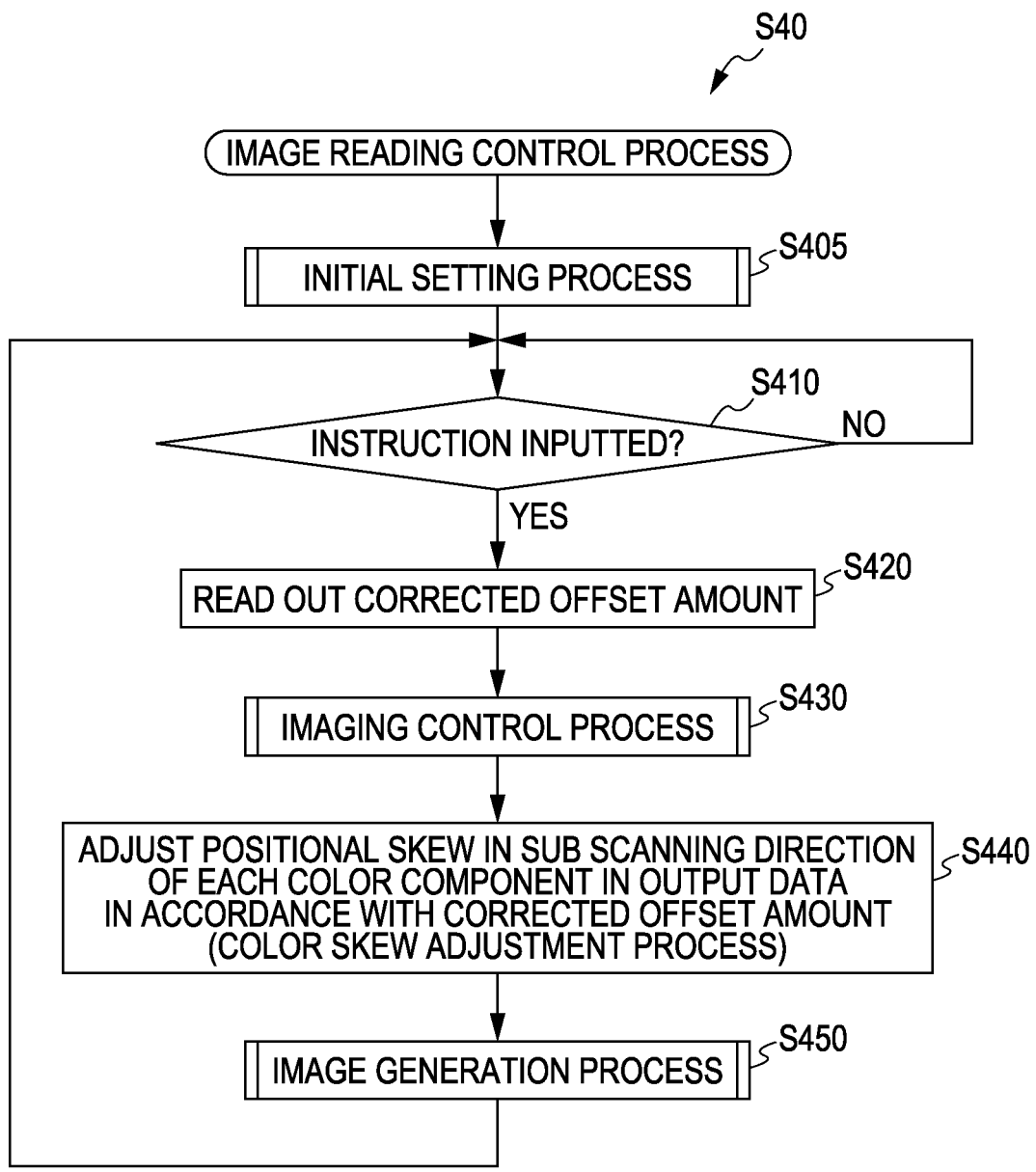
FIG. 12 is a flowchart illustrating an image reading control process executed by a main control unit of an image scanner according to the second embodiment.

FIG. 12 is a flowchart illustrating the image reading control process (S40) executed by the main control unit 130 of the image scanner 12 according to the second embodiment. The image reading control process (S40) is a process implemented by the image reading control unit 810 of the main control unit 130. In this embodiment, the main control unit 130 commences the image reading control process (S40) when the power to the image scanner 12 is turned on.

When the image reading control process (S40) is commenced, the main control unit 130 of the image scanner 12 executes an initial setting process (S405). In the initial setting process (S405), the main control unit 130 adjusts the image reading unit 140. In this embodiment, after adjusting the amount and emission distribution of the light emitted from the document illumination unit 40 and adjusting the black level output from the line sensors 560R, 560G, and 560B, the main control unit 130 moves the carriage 142 to a standby position.

After the initial setting process (S405), the main control unit 130 stands by until the input of an instruction from a user, instructing the document 90 to be read, is accepted via the user interface 190 ("NO" in S410).

In the case where the input of an instruction from the user has been accepted via the user interface 190 ("YES" in S410), the main control unit 130 reads out the corrected offset amount AV from the storage unit 820 (S420).

After the corrected offset amount AV has been read out (S420), the main control unit 130 executes an imaging control process (S430) by operating as the imaging control unit 812. In the imaging control process (S430), the main control unit 130 controls the movement of the carriage 142 performed by the transport mechanism unit 144, and controls the imaging of the document 90 by the imaging unit 56 in synchronization with the movement of the carriage 142.

After the imaging control process (S430), the main control unit 130 executes a color skew adjustment process (S440) by operating as the color skew adjustment unit 815. In the color skew adjustment process (S440), based on the corrected offset amount AV read out from the storage unit 820, the main control unit 130 adjusts the positional skew in the scan data of each of the color components as captured by the line sensors 560R, 560G, and 560B of the imaging unit 56 during the imaging control process (S430).

After the color skew adjustment process (S440), the main control unit 130 executes an image generation process (S450) by operating as the image generating unit 816. In the image generation process (S450), the main control unit 130 generates image data expressing the document 90 based on the scan data of each of the color components, adjusted in the color skew adjustment process (S440). In this embodiment, the main control unit 130 outputs the image data generated in the image generation process (S450) to an external device (not shown) via the device interface 180.

After the image generation process (S450), the main control unit 130 once again stands by until the input of an instruction from a user is accepted via the user interface 190 ("NO" in S410), and when the input of an instruction from the user is accepted via the user interface 190 ("YES" in S410), the processing from reading out the corrected offset amount (S420) is repeated.

According to the image scanner 12 of the second embodiment described thus far, the design offset amount DV for adjusting the positional skew in the sub scanning direction of the scan data of each of the color components as captured by the line sensors 560R, 560G, and 560B can be corrected based on the magnification change amount ME arising due to individual error in the optical magnification of the optical system leading from the document 90 to the light-receiving element 562, and thus color skew in the image data expressing the document 90 can be suppressed.

C. Other Embodiments

Although embodiments of the invention have been described thus far, it should be noted that the invention is not intended to be limited in any way to the aforementioned embodiments, and it goes without saying that the invention can be achieved in various forms without departing from the spirit of the invention.

For example, although the first embodiment described the offset correction process (S220) as being executed before reading the document 90, in another embodiment, this process may be executed at a pre-set timing, a regular timing, or the like, or may be executed in accordance with a request from the user.

Furthermore, in the first variation of the first embodiment, the design offset amount DV is corrected based on the magnification change amount a arising due to the distance between the document 90 and the transparent plane 114 in addition to the magnification change amount ME arising due to individual error in the optical magnification, deterioration due to age, and so on of the optical system; however, in another embodiment, the design offset amount DV may be corrected based on the magnification change amount a arising due to the distance between the document 90 and the transparent plane 114 instead of the magnification change amount ME arising due to individual error in the optical magnification, deterioration due to age, and so on of the optical system.

Furthermore, in the second variation of the first embodiment, the design offset amount DV is corrected based on the magnification change amount arising due to the autofocus function in addition to the magnification change amount ME arising due to individual error in the optical magnification, deterioration due to age, and so on of the optical system; however, in another embodiment, the design offset amount DV may be corrected based on the magnification change amount arising due to the autofocus function instead of the magnification change amount ME arising due to individual error in the optical magnification, deterioration due to age, and so on of the optical system.

Finally, although the embodiments of the invention describe applying the invention to a flat-bed image scanner, in another embodiment, the invention may be applied to another type of image scanner, such as an automatic document feedtype image scanner, and can also be applied to other image reading apparatuses, such as facsimile devices, copiers, multi-function peripherals, and so on.

What is claimed is:

1. An image reading apparatus that optically reads a document, the apparatus comprising:
    multiple line sensors provided approximately parallel to each other and each having light-receiving elements arranged in line form, each line sensor capturing respective line-shaped regions spanning in the main scanning direction of the document in respective color components;
    a movement unit that causes the positional relationship between the document and the multiple line sensors to move relative to the sub scanning direction that is orthogonal to the main scanning direction;
    a color skew adjustment unit that adjusts positional skew in the sub scanning direction in scan data of each of the color components captured by the multiple line sensors in synchronization with the movement caused by the movement unit, in accordance with an offset amount based on the distance between each of the multiple line sensors;
    an image generating unit that generates image data expressing the document based on the scan data of each of the color components adjusted by the color skew adjustment unit; and
    an offset correction unit that corrects the offset amount used in the adjustment of the scan data based on a magnification change amount, the magnification change amount being the amount of change in the image formation magnification from a design value, an image of the document being formed upon the light-receiving elements, wherein the offset correction unit corrects the offset amount used in the adjustment of the scan data based on the magnification change amount after the image reading apparatus has been started up and before reading the document.

2. The image reading apparatus according to claim 1, further comprising:
    a lens that forms light from the document as an image upon the multiple line sensors; and
    a focus unit that causes the lens to move to a position in which the document is in focus,
    wherein the offset correction unit includes a third correction unit that corrects the offset amount used in the adjustment of the scan data based on a magnification change amount arising due to the movement of the lens by the focus unit.

3. The image reading apparatus according to claim 1, further comprising:
    first and second markers provided at a basic distance from each other in positions in which the markers be able to be captured by the multiple line sensors,
    wherein the offset correction unit includes:
    an imaging distance calculation unit that calculates an imaging distance indicating the distance between the first and second markers based on image data obtained by reading the first and second markers using the multiple line sensors;
    a change amount calculation unit that calculates the magnification change amount by comparing the basic distance with the imaging distance; and
    a first correction unit that corrects the offset amount used in the adjustment of the scan data based on the magnification change amount calculated by the change amount calculation unit.

4. The image reading apparatus according to claim 1, further comprising:
    a document plate forming a transparent plane that is transparent to the multiple line sensors and that holds the document,
    wherein the offset correction unit includes a second correction unit that corrects the offset amount used in the adjustment of the scan data based on a magnification change amount arising due to the distance between the document and the transparent plane.

5. An image reading apparatus that optically reads a document, the apparatus comprising:
    multiple line sensors provided approximately parallel to each other and each having light-receiving elements arranged in line form, each line sensor capturing respective line-shaped regions spanning in the main scanning direction of the document in respective color components;
    a movement unit that causes the positional relationship between the document and the multiple line sensors to move relative to the sub scanning direction that is orthogonal to the main scanning direction;
    a storage unit that stores a corrected offset amount, in which an offset amount in the sub scanning direction based on the distance between the multiple line sensors in scan data of each of the color components captured by the multiple line sensors has been corrected, prior to shipping, based on individual error of the optical magnification in the optical system leading from the document to the light-receiving elements;
    a color skew adjustment unit that adjusts positional skew in the sub scanning direction in scan data of each of the color components captured by the multiple line sensors in synchronization with the movement caused by the movement unit, in accordance with the corrected offset amount stored in the storage unit;
    an image generating unit that generates image data expressing the document based on the scan data of each of the color components adjusted by the color skew adjustment unit; and
    an offset correction unit that corrects the offset amount used in the adjustment of the scan data based on a magnification change amount, the magnification change amount being the amount of change in the image formation magnification from a design value, an image of the document being formed upon the light-receiving elements, wherein the offset correction unit corrects the offset amount used in the adjustment of the scan data based on the magnification change amount after the image reading apparatus has been started up and before reading the document.

6. An image reading method for optically reading a document, the method comprising:
    capturing respective color components of respective line-shaped regions spanning in the main scanning direction of the document using multiple line sensors provided approximately parallel to each other and each having light-receiving elements arranged in line form;
    moving the positional relationship between the document and the multiple line sensors relative to the sub scanning direction that is orthogonal to the main scanning direction;
    adjusting color skew in the sub scanning direction in scan data of each of the color components captured by the multiple line sensors in synchronization with the movement carried out in the process of moving, in accordance with an offset amount based on the distance between each of the multiple line sensors;

generating image data expressing the document based on the scan data of each of the color components adjusted in the process of adjusting; and correcting the offset amount used in the adjustment of the scan data based on a magnification change amount, the magnification change amount being the amount of change in the image formation magnification from a design value, an image of the document being formed upon the light-receiving elements, wherein correcting the offset amount used in the adjustment of the scan data is based on the magnification change amount after the image reading apparatus has been started up and before reading the document.

7. The image reading method according to claim 6, wherein the process of correcting is executed prior to the image reading apparatus being shipped.

8. The image reading method according to claim 6, wherein the process of correcting includes:

capturing, using the multiple line sensors, first and second markers provided at a basic distance from each other in positions in which the markers can be captured by the multiple line sensors;

calculating an imaging distance indicating the distance between the first and second markers based on image data obtained by reading the first and second markers using the multiple line sensors; and calculating the magnification change amount by comparing the basic distance with the imaging distance.

9. The image reading method according to claim 6, wherein the process of correcting is executed after the image reading apparatus has been started up and before the document is read.

* * * * *